United States Patent
Baumann et al.

(10) Patent No.: US 11,359,737 B2
(45) Date of Patent: Jun. 14, 2022

(54) PRESSURE RELIEF DEVICE AND METHOD FOR ITS PRODUCTION

(71) Applicant: SCHUNK KOHLENSTOFFTECHNIK GMBH, Heuchelheim (DE)

(72) Inventors: Soeren Baumann, Giessen (DE); Tasja Jawojsz, Wetzlar (DE)

(73) Assignee: SCHUNK KOHLENSTOFFTECHNIK GMBH, Heuchelheim (DE)

( * ) Notice: Subject to any disclaimer, the term of this patent is extended or adjusted under 35 U.S.C. 154(b) by 129 days.

(21) Appl. No.: 16/636,084

(22) PCT Filed: Jul. 17, 2018

(86) PCT No.: PCT/EP2018/069405
§ 371 (c)(1),
(2) Date: Feb. 3, 2020

(87) PCT Pub. No.: WO2019/034353
PCT Pub. Date: Feb. 21, 2019

(65) Prior Publication Data
US 2021/0095775 A1 Apr. 1, 2021

(30) Foreign Application Priority Data
Aug. 17, 2017 (EP) .................... 17186640

(51) Int. Cl.
*F16K 17/16* (2006.01)

(52) U.S. Cl.
CPC ..... *F16K 17/1633* (2013.01); *Y10T 137/8811* (2015.04)

(58) Field of Classification Search
CPC .................. F16K 17/1633; Y10T 137/8811
See application file for complete search history.

(56) References Cited

U.S. PATENT DOCUMENTS 2,947,443 A    8/1960   Sawyer
4,102,469 A *   7/1978   Shegrud .................. F16K 17/16
                                                          137/68.23

(Continued)

FOREIGN PATENT DOCUMENTS

JP    H0611059 A    1/1994
JP    2004293642 A    10/2004

(Continued)

*Primary Examiner* — Craig M Schneider
*Assistant Examiner* — Frederick D Soski
(74) *Attorney, Agent, or Firm* — Dickinson Wright PLLC; Andrew D. Dorisio

(57) ABSTRACT

The invention relates to a pressure relief device and to a method for producing a pressure relief device, the pressure relief device (10) comprising a rupture disc (11) and a vacuum support (12, 32), the rupture disc and the vacuum support being made of graphite, the one-piece rupture disc having an exit side (13) and an entry side (14), the rupture disc having a recess (15) on the entry side, said recess (15, 33) forming a rupture area (17) within a retainer (16) of the rupture disc, the vacuum support being inserted in the recess, the pressure relief device having a carbon retaining device (30) for a form-fitted fastening of the vacuum support in the recess.

14 Claims, 2 Drawing Sheets

(56) References Cited

U.S. PATENT DOCUMENTS

Figure 5:
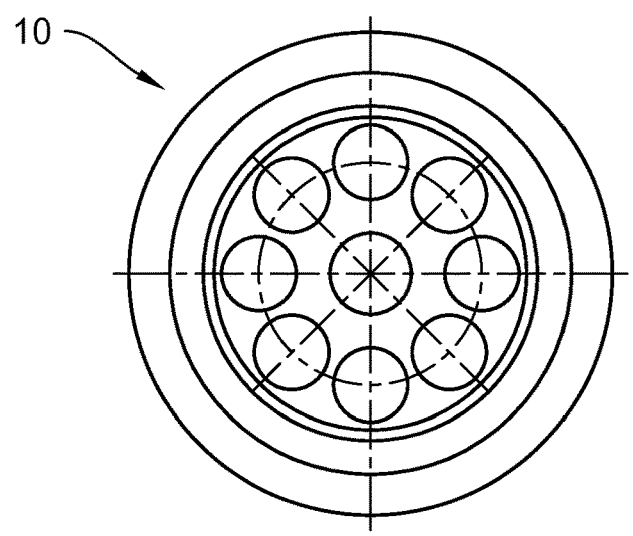

| | | | |
|---|---|---|---|
| 5,121,847 A * | 6/1992 | Ellis | F16K 17/1633 220/203.08 |
| 5,579,942 A | 12/1996 | Palmer et al. | |
| 5,583,490 A * | 12/1996 | Santos | F16K 17/16 137/557 |
| 5,979,477 A * | 11/1999 | Stillings | F16K 17/16 137/1 |
| 6,254,982 B1 * | 7/2001 | Clark | F16K 17/1633 137/68.19 |
| 6,311,715 B1 | 11/2001 | Wadkins | |
| 6,378,544 B1 * | 4/2002 | DiBello | F16K 17/16 137/68.25 |
| 6,588,447 B1 * | 7/2003 | Hendey | G01F 15/007 137/315.06 |
| 7,987,867 B2 * | 8/2011 | Husband | F16K 17/16 137/15.18 |
| 8,020,577 B1 * | 9/2011 | Gabel | F16K 17/16 137/68.23 |
| 8,322,360 B2 * | 12/2012 | Wilson | E04B 1/98 137/68.23 |
| 9,291,100 B2 * | 3/2016 | Mihara | F01D 25/24 |
| 10,228,069 B2 * | 3/2019 | Wilson | B23K 15/0006 |
| 2003/0127132 A1 * | 7/2003 | Turner | F16K 17/1633 137/68.23 |
| 2004/0025936 A1 * | 2/2004 | Wadkins | F16K 17/1633 137/68.23 |

FOREIGN PATENT DOCUMENTS

| | | |
|---|---|---|
| JP | 2009523968 A | 6/2009 |
| JP | 2010019380 A | 1/2010 |

* cited by examiner

Fig. 1
Fig. 2
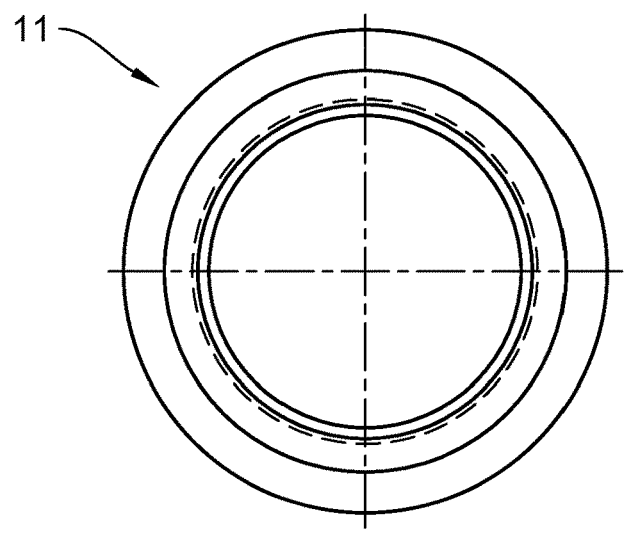
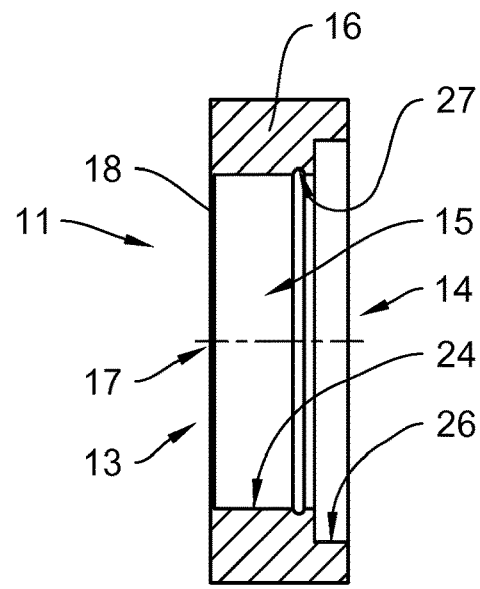
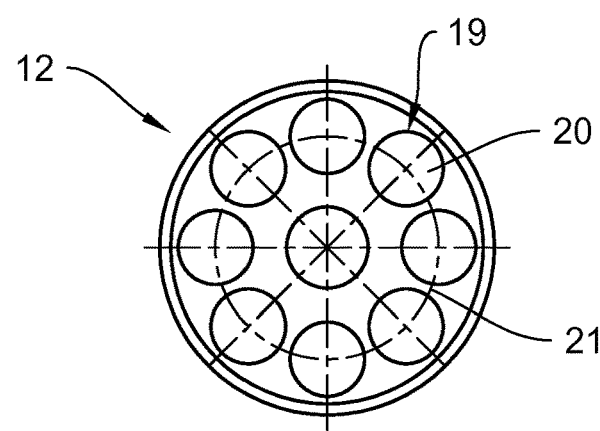
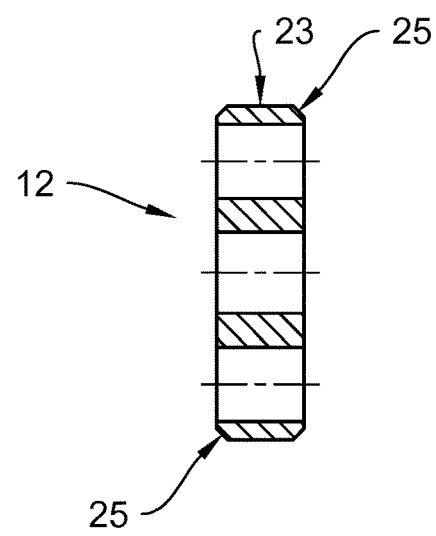
Fig. 3
Fig. 4

PRESSURE RELIEF DEVICE AND METHOD FOR ITS PRODUCTION

TECHNICAL FIELD OF THE INVENTION

The invention relates to a pressure relief device and a method for producing a pressure relief device comprising a rupture disc and a vacuum support, the rupture disc and the vacuum support being made of graphite, the one-piece rupture disc having an exit side and an entry side, the rupture disc having a recess on the entry side, the recess forming a rupture area within a retainer, the vacuum support being inserted in the recess.

BACKGROUND OF THE INVENTION

Such pressure relief devices are sufficiently known and are commonly employed in apparatus technology against positive pressure and negative pressure. A pressure relief device is meant to reliably hinder unwitting pressure levels in apparatus from being exceeded or fallen below by the pressure relief device or rather its rupture disc bursting. In such an instance, a membrane of the rupture disc is irrevocably damaged. The membrane can be a metal foil or be made of graphite. The choice of material for the membrane or the rupture disc always depends on the respective area of application. In corrosive applications, for example, the pressure relief valves are commonly made of graphite which is resistant against acid corrosion. For gas-proof embodiments of graphite, it can be coated with a resin. It is also known to coat rupture discs with pyrolytically precipitated carbon in order to receive a gas-proof rupture disc which is resistant to high temperatures. Furthermore, pressure relief devices are known in which a rupture disc is flat and clamped between two retainers with seals. In high-temperature applications, it can also be sensible, however, to forgo one of the seals and to integrally form the rupture disc with the retainer, i.e., realize it in one piece.

Commonly a pressure relief device has a vacuum support which is to prevent a membrane from bursting due to negative pressure within a pressure pipeline, for example. Otherwise, fragments of the rupture disc could pass into the pressure pipeline, a scenario which is to be avoided at all costs. The relative position of the vacuum support to the rupture disc therefore determines a position of an exit side and an entry side of the pressure relief device. Since the vacuum support rests against or is disposed adjacent to the membrane, the membrane can only burst in the direction of the exit side. Ergo, the vacuum support is always placed within a closed system of an installation and must also be resistant to corrosion.

In particular one-piece rupture discs, i.e., rupture discs comprising a retainer having a recess which forms a membrane, require the vacuum support to be inserted and securely fastened in the recess. A one-piece design of the vacuum support together with the membrane is not possible in this instance since the membrane could no longer be realized having an exactly defined burst pressure. The vacuum support is commonly fastened within the recess and adjacent to the membrane by means of an adhesive material. In such pressure relief devices, however, this poses a disadvantage as they are limited to application temperatures for which the adhesive material is still suitable. The adhesive material further limits an application of the rupture disc for certain chemical compositions since the adhesive material is not entirely chemically resistant.

Thus, the rupture disc can unwittingly burst when, for example, the adhesive has dissolved. Moreover, components of the adhesive material can pass into an installation and unwittingly contaminate it. This risk exists in particular in high-temperature applications.

SUMMARY OF THE INVENTION

The object of the invention at hand is therefore to propose a pressure relief device and a method for its production which both enable a use of the pressure relief device at high temperatures or in chemically aggressive mediums.

The object is attained by a pressure relief device and by a method as claimed.

The pressure relief device according to the invention has a rupture disc and a vacuum support, the rupture disc and the vacuum support being made of graphite, the one-piece rupture disc having an exit side and an entry side, the rupture disc having a recess on the entry side, the recess forming a rupture area within a retainer of the rupture disc, the vacuum support being inserted in the recess, the pressure relief device having a carbon retaining device for a form-fitted fastening of the vacuum support in the recess.

Since the vacuum support is fastened in the recess in a form-fitted manner, a substance-to-substance bond of the vacuum support by means of an adhesive material, for example, is not necessary. The adhesive material can therefore no longer dissolve at high temperatures or in chemically aggressive mediums within an apparatus or an installation or contaminate an atmosphere within the apparatus. While it is generally possible to additionally fasten the vacuum support within the recess by means of an adhesive material, it is, however, ensured via the form-fitted fastening of the vacuum support in the recess that the vacuum support cannot become loose in the recess when the adhesive material dissolves. As the retaining device is made of carbon like the rupture disc and the vacuum support, the retaining device is also chemically resistant and can be exposed to high temperatures. The pressure relief device can consequently be used at high application temperatures of up to 500° C. in an oxidative atmosphere and up to 1.400° C. in an inert atmosphere. Overall, the rupture disc can simply be axially symmetric.

It is advantageous if the pressure relief device is made free of adhesive material and/or of metal. In this way, it can at least be ensured that an atmosphere of an installation is not chemically contaminated. In particular, metals can release oxidation products which can unwittingly contaminate an atmosphere of an installation. A pressure relief device free of adhesive material and/or metal is particularly suitable for applications which require a chemically pure atmosphere.

It is thus particularly advantageous if the pressure relief device is made entirely of carbon. No other substance which could contaminate an atmosphere of an installation or an apparatus can then be found on the entry side of the pressure relief device besides carbon. The pressure relief device can also consist of modifications of or special forms of carbon. This applies in particular to the material of the retaining device.

The rupture area can have an evenly thick and flat membrane. The rupture area can be realized, for example, by the recess in the rupture disc being formed by, for example, machining in such a manner that a comparatively thin membrane in comparison to the retainer remains in the area of the exit side of the rupture disc. In order to be able to predict a burst pressure as precisely as possible, it is advantageous if this membrane is evenly thick and flat. Nevertheless, it is possible to form such a recess on the exit side but which could not serve for receiving the vacuum support. By realizing this recess, it becomes possible to form the membrane and the retainer integrally as one component.

The membrane can have a predetermined breaking point formed from material fatigue. The material fatigue can be a circumjacent or cross-shaped groove in the membrane. The membrane can then be realized thicker in comparison.

The rupture disc can be infiltrated by and/or be coated with pyrolytic carbon from the gaseous phase so that the membrane is gas-proof.

The rupture disc can be realized particularly easily if the exit side of the rupture disc is entirely flat. The rupture area or a membrane forming the rupture area can then be produced solely by forming the recess.

The vacuum support can be shaped like a disc and can abut against an inner diameter of the retainer with its outer diameter. Between the outer diameter and the inner diameter, a clearance fit, preferably a clamping fit, can be formed as a result of the form-fitted fastening of the vacuum support in the recess. Since no forces have to be transmitted in a radial direction of the vacuum support, a radial clearance of the vacuum support can be tolerated within the recess, whereby the pressure relief device can be produced even more easily.

Furthermore, a plurality of through passages can be formed in the vacuum support. The through openings can be through bores, for example, which are disposed annularly and at equal distances in the vacuum support and can thus ensure that a pressure is evenly distributed on the entry side or rather the rupture area. Generally, the vacuum support can be formed having any other through openings.

In the recess, an abutment can be formed which limits a movement of the vacuum support toward the rupture area. It can thus be prevented that the vacuum support can abut against a membrane of the rupture disc or that a pressure force can act on the membrane via its own weight, for example, and thus unwittingly destroy the membrane.

The retaining device can be formed from a groove in an inner surface of the retainer and from a retaining element inserted in the groove. Thus, the vacuum support can be assembled in the recess particularly by simply inserting the vacuum support in the recess and subsequently inserting the retaining element in the groove. The retaining element can then radially protrude so far over the groove to the inner surface of the retainer that the vacuum support can no longer fall out of the recess, whereby a form-fitted fastening of the vacuum support can be realized in the recess. In the scope of realizing the recess for example, the groove can be easily produced by machining. The retaining element can be realized such that it can be wedged in the groove or also be fastened in the groove in a form-fitted manner.

It is advantageous if the vacuum support abuts against the rupture area with one end and against the retaining element with an opposite end. An axial movement of the vacuum support within the recess can thus be easily prevented. It can be ensured to the greatest extent possible that potential fragments of the rupture disc can only pass on the exit side.

In one embodiment, the groove can be made from a circular groove. In another embodiment, the groove can also be helical or radially extend only in sections, a circular groove being the easiest to produce.

The retaining element can be a string, braid, cord or band all made of carbon fibers. The retaining element can also be a ring which is made from graphite through machining, however, such a ring is difficult to produce and can easily break. A retaining element stranded or braided from carbon fibers, in contrast, can be easily shaped into any form and be adapted to the groove. In a particularly simple embodiment, it can be intended to insert or stuff the stranded or braided carbon fibers in the groove and to fasten them there.

However, it is advantageous if the carbon fibers are infiltrated by and/or coated with pyrolytic carbon. A shape of the retaining element can then be easily formed and rigidly fastened. The carbon fibers can, for example, be wound around a mandrel and then be infiltrated by and/or coated with the pyrolytic carbon so that a circular retaining element is realized. Consequently, the retaining element can be at least partially rigid.

Thus, the retaining element can form a spring washer which can be simply inserted in the groove and be fastened there in a form-fitted manner by means of its resilience.

In the method according to the invention for producing a pressure relief device, a rupture disc and a vacuum support of the pressure relief device are made of graphite, the rupture disc being made in one piece having an exit side and an entry side, a recess being formed on the entry side of the rupture disc, the recess forming a rupture area within a retainer of the rupture disc, the vacuum support being inserted in the recess, a retaining element of the pressure relief device being made of carbon, the vacuum support being fastened in the recess in a form-fitted manner by means of the retaining element. The description of advantages of the pressure relief device according to the invention is referenced with regard to the advantageous effects of the method according to the invention. Further advantageous embodiments of the method can be derived from the description of features of the dependent claims referring to claim 1.

BRIEF DESCRIPTION OF THE DRAWING FIGURES

In the following, an advantageous embodiment of the invention is further described with reference to the attached drawings.

Figure 6:
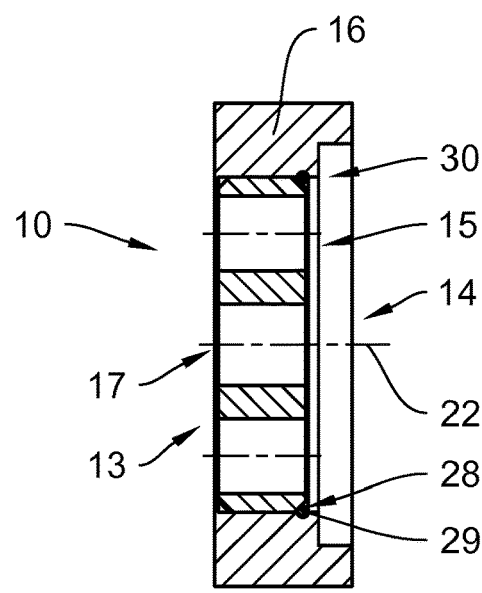
Figure 7:
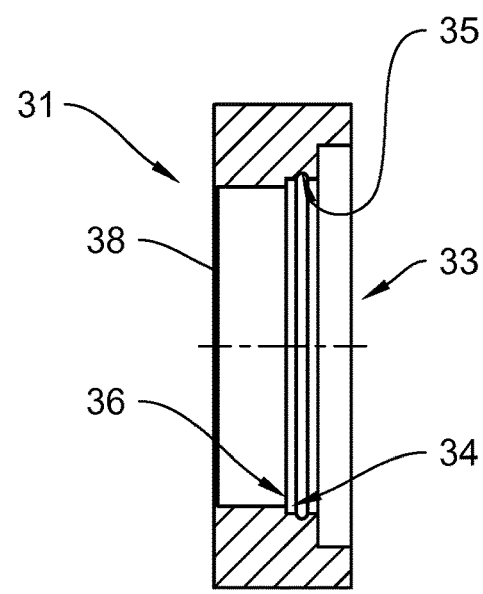
Figure 8:
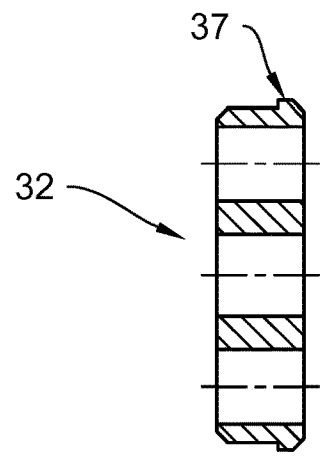

FIG. 1 shows a top view of a rupture disc;
FIG. 2 shows a longitudinal section of the rupture disc;
FIG. 3 shows a top view of a vacuum support;
FIG. 4 shows a longitudinal section of the vacuum support;
FIG. 5 shows a top view of a pressure relief device;
FIG. 6 shows a longitudinal section of the pressure relief device;
FIG. 7 shows a longitudinal section of a further rupture disc;
FIG. 8 shows a longitudinal section of a further vacuum support.

DETAILED DESCRIPTION OF THE INVENTION

A synopsis of FIGS. 1 to 6 shows a pressure relief device 10 having a rupture disc 11 and a vacuum support 12, rupture disc 11 and vacuum support 12 being made entirely of graphite. One-piece rupture disc 11 comprises an exit side 13 and an entry side 14, an essentially circular recess 15 being formed in entry side 14. A retainer 16 and a rupture area 17 of rupture disc 11 are formed via recess 15, rupture area 17 being an evenly thick and flat membrane 18. Exit side 13 of rupture disc 11 is entirely flat.

Vacuum support 12 is shaped like a disc and has a plurality of through openings 19. Through openings 19 are realized as bores 20 coaxially and relative to a longitudinal axis 22 of pressure relief device 10 along an annulus 21. Vacuum support 12 is inserted such in recess 15 that an outer diameter 23 of vacuum support 12 essentially abuts against an inner diameter 24 of retainer 16 or against recess 15. Furthermore, bevels 25 are formed on outer diameter 23 which facilitate inserting vacuum support 12 in recess 15.

Within recess 15, a shouldered inner diameter 26 and a circular groove 27 are formed. In circular groove 27, a retaining element 28 is inserted which is made of carbon fibers (not further illustrated) infiltrated by and coated with pyrolytic carbon. Retaining element 28 is essentially rigid and forms a spring washer 29 which holds vacuum support 12 in recess 15 in a form-fitted manner. Circular groove 27 is disposed such in recess 15 that vacuum support 12 is fastened essentially without clearance in recess 15 in the axial direction relative to longitudinal axis 22. Circular groove 27 and retaining element 28 consequently form a retaining device 30.

A synopsis of FIGS. 7 and 8 shows a rupture disc 31 and a vacuum support 32 of a pressure relief device not entirely illustrated. In contrast to the rupture disc from FIG. 2, a ledge 34 having a circular groove 35 is formed in a recess 33 of rupture disc 31. Ledge 34 forms an abutment 36 for an annular projection 37 formed at vacuum support 32. It can thus be prevented that vacuum support 32 can abut against a membrane 38 of rupture disc 31 or that a pressure force can act on membrane 38 which would unwittingly destroy membrane 38.

The invention claimed is:

1. A pressure relief device (10), comprising a rupture disc (11, 31) and a vacuum support (12, 32), the rupture disc and the vacuum support being made of graphite, the rupture disc having an exit side (13) and an entry side (14), the rupture disc having a recess (15, 33) on the entry side, said recess (15, 33) forming a rupture area (17) within a retainer (16) of the rupture disc, the vacuum support being inserted in the recess, characterized in that the pressure relief device has a carbon retaining device (30) for a form-fitted fastening of the vacuum support in the recess;
wherein the retaining device (30) is made of a groove in an inner surface of the retainer (16) and a retaining element (28) inserted in the groove, and wherein the retaining element (28) is a string, braid, cord or band made of carbon fibers.

2. The pressure relief device according to claim 1, characterized in that the rupture area (17) has an evenly thick and flat membrane (18, 38).

3. The pressure relief device according to claim 2, characterized in that the membrane (18, 38) has a predetermined breaking point realized from material fatigue.

4. The pressure relief device according to claim 1, characterized in that the pressure relief device (10) is made free of adhesive material and/or metal.

5. The pressure relief device according to claim 1, characterized in that the pressure relief device (10) is made entirely of carbon.

6. The pressure relief device according to claim 1, characterized in that the exit side (13) of the rupture disc (11, 31) is designed entirely flat.

7. The pressure relief device according to claim 1, characterized in that the vacuum support (12, 32) is shaped like a disc and abuts against an inner diameter (24) of the retainer (16) with an outer diameter (23) of the vacuum support.

8. The pressure relief device according to claim 1, characterized in that a plurality of through openings (19) are formed in the vacuum support (12, 32).

9. The pressure relief device according to claim 1, characterized in that the vacuum support (12, 32) abuts against the rupture area (17) with one end and against the retaining element (28) with an opposite end.

10. The pressure relief device according to claim 1, characterized in that the groove is realized as a circular groove (27, 35).

11. The pressure relief device according to claim 1, characterized in that the carbon fibers are infiltrated by and/or coated with pyrolytic carbon.

12. The pressure relief device according to claim 1, characterized in that the retaining element (28) is at least partially rigid.

13. The pressure relief device according to claim 1, characterized in that the retaining element (28) forms a spring washer (29).

14. A method for producing a pressure relief device (10), a rupture disc (11, 31) and a vacuum support (12, 32) of the pressure relief device being made of graphite, the rupture disc being made in one piece having an exit side (13) and an entry side (14), a recess (15, 33) being formed on the entry side of the rupture disc and forming a rupture area (17) within the retainer (16) of the rupture disc, the vacuum support being inserted in the recess, characterized in that a retaining device (30) of the pressure relief device is made of carbon, the vacuum support being fastened in the recess in a form-fitted manner by means of the retaining device;
wherein the retaining device (30) is made of a groove in an inner surface of the retainer (16), wherein a retaining element (28) is inserted in the groove, and wherein the retaining element (28) is a string, braid, cord or band made of carbon fibers.

* * * * *